United States Patent
Ji et al.

(10) Patent No.: US 12,305,903 B2
(45) Date of Patent: May 20, 2025

(54) ICE MAKER, REFRIGERATOR AND CONTROL METHOD OF THE SAME

(71) Applicant: DAE CHANG CO., LTD, Jeongeup-si (KR)

(72) Inventors: Joon Dong Ji, Suwon-si (KR); Gye Young Shin, Suwon-si (KR); Dong Hyuk Yim, Suwon-si (KR)

(73) Assignee: DAE CHANG CO., LTD, Jeongeup-si (KR)

( * ) Notice: Subject to any disclaimer, the term of this patent is extended or adjusted under 35 U.S.C. 154(b) by 673 days.

(21) Appl. No.: 17/629,411

(22) PCT Filed: Dec. 20, 2019

(86) PCT No.: PCT/KR2019/018257
§ 371 (c)(1),
(2) Date: Jan. 24, 2022

(87) PCT Pub. No.: WO2021/020664
PCT Pub. Date: Feb. 4, 2021

(65) Prior Publication Data
US 2022/0260296 A1     Aug. 18, 2022

(30) Foreign Application Priority Data
Jul. 29, 2019   (KR) .......................... 10-2019-0091953

(51) Int. Cl.
*F25C 1/25*           (2018.01)

(52) U.S. Cl.
CPC ............ *F25C 1/25* (2018.01); *F25C 2400/10* (2013.01); *F25C 2700/04* (2013.01)

(58) Field of Classification Search
CPC .............. F25C 2600/04; F25C 2400/14; F25C 2700/12; F25C 2700/04; F25C 1/243
See application file for complete search history.

(56) References Cited

U.S. PATENT DOCUMENTS

| 6,339,930 | B2  | 1/2002 | Horey |
| 2017/0089629 | A1* | 3/2017 | Ji ............................ F25C 5/08 |

(Continued)

FOREIGN PATENT DOCUMENTS

| KR | 10-2009-0099908 A | 9/2009 |
| KR | 10-2010-0054489 A | 5/2010 |

(Continued)

OTHER PUBLICATIONS

International Search Report mailed May 28, 2020 for International Application No. PCT/KR2019/018257 and its English translation.

*Primary Examiner* — Nelson J Nieves
*Assistant Examiner* — Meraj A Shaikh
(74) *Attorney, Agent, or Firm* — Insight Law Group, PLLC; Seung Lee

(57) ABSTRACT

Provided are an ice maker, a refrigerator, and a method for controlling the same, which can accurately detect whether ice-making water in accommodated in an ice-making groove is full.
To this end, an ice maker according to the present disclosure includes: a control box having a control unit disposed therein, an ice tray disposed on one side surface of the control box, and formed with an ice-making groove in which ice-making water is accommodated, a water supply unit configured to supply the ice-making water to the ice-making groove, and a detecting unit configured to detect the water level of the ice-making water accommodated in the ice-making groove, in which the detecting unit includes: a sensor housing formed of a non-conductor spaced apart from the ice tray and installed on one side surface of the control box, and having a water level measuring hole into which the ice-making water in the ice-making groove flows formed in one side surface thereof, a sensor formed of a conductor being in contact with the ice-making water flowing into the sensor housing through the water level measuring hole to (Continued)

detect the water level of the ice-making water, and a connector wire having one end connected to the sensor, and the other end connected to the control unit.

12 Claims, 13 Drawing Sheets

(56) References Cited

U.S. PATENT DOCUMENTS

2017/0299244 A1* 10/2017 Alshourbagy ............ F25C 5/06
2020/0064043 A1* 2/2020 Larson .................... F25C 5/08

FOREIGN PATENT DOCUMENTS

| KR | 10-2010-0087114 A | 8/2010 | |
|---|---|---|---|
| KR | 10-2017-0032142 A | 3/2017 | |
| KR | 10-2018-0080056 A | 7/2018 | |
| KR | 2409775 B1 * | 6/2022 | ............... F25C 1/24 |

* cited by examiner

ICE MAKER, REFRIGERATOR AND CONTROL METHOD OF THE SAME

CROSS-REFERENCE TO RELATED APPLICATIONS

This application is a National Stage Entry of International Application No. PCT/KR2019/018257, filed on Dec. 20, 2019, which claims the benefit of and priority to Korean Patent Application No. 10-2019-0091953, filed on Jul. 29, 2019, the contents of which are herein incorporated by reference in their entirety.

BACKGROUND

(a) Technical Field

The present disclosure relates to an ice maker, a refrigerator, and a method for controlling the same.

(b) Background Art

In general, a refrigerator is provided with a cabinet having a refrigerating compartment configured to refrigerate and store food and a freezing compartment configured to freeze and store food, and a compressor configured to compress refrigerant and a heat exchanger configured to generate cold air are installed on the rear of the cabinet.

The cold air generated by the heat exchanger can be supplied into the refrigerating compartment or the freezing compartment by a fan, and air whose temperature is increased by being circulated in the refrigerating compartment or the freezing compartment is supplied back to the refrigerating compartment or the freezing compartment through the heat exchanger, thereby always keeping the food stored in the refrigerating compartment or the freezing compartment fresh.

In the past, as an ice maker, a container that can be simply stored in the freezing compartment and has a regular volume was used, but in recent years, an ice maker that increases user convenience by automatically storing and drawing out/supplying ice from the supply of purified water is installed in the freezing compartment or the refrigerating compartment.

The ice maker provided in the refrigerator can automatically receive ice-making water in an ice-making groove formed in an ice tray, and then uses the cool air of the refrigerator to freeze the ice-making water accommodated in the ice-making groove, or have a refrigerant pipe through which the refrigerant of the refrigerator flows into the ice tray installed to freeze the ice-making water accommodated in the ice-making groove. When the ice-making of the ice-making water is completed, the ice-made ice can be automatically removed from the ice tray and loaded into an ice storage container installed in the refrigerator.

The ice maker has the advantage capable of obtaining ice without a user's separate operation for the ice-making operation, and therefore, has been widely used in recent years.

The ice maker can be provided with a water supply unit configured to supply water to the ice-making groove, and the water supply unit can open or close a water supply valve, and therefore, the water supply unit can supply water or stop the water supply to the ice-making groove.

However, this water supply control method simply controls to supply water to the ice-making groove of the ice tray for a set time, and cannot supply an exact amount of water to the tray because other factors are not considered. In other words, there is a problem in that the size of the ice is too small or the ice is too much because too little water is supplied into the tray to overflow from the tray, thereby causing the water to flow into the ice storage container or other spaces of the refrigerator.

Korean Patent Application Laid-Open No. 10-2009-0099908 (published on Sep. 23, 2009) (hereinafter, referred to as the 'related art') discloses a 'REFRIGERATOR AND METHOD FOR CONTROLLING THE SAME' in which if two electrodes are installed in an ice-making groove and the two electrodes are energized, it is determined that the ice-making groove is full of the ice-making water.

However, according to the related art, if a user touches the ice tray or an external shock is applied to the ice maker while water is being supplied to the ice-making groove of the ice tray, a phenomenon in which the water supplied to the ice-making groove is swayed or bounced can occur. In particular, since a difference in water pressure flowing into the refrigerator is different for each home, there is a high possibility that the phenomenon in which the water is swayed or bounced occurs in a household with a high water pressure.

Therefore, according to the related art, there is a problem in that the two electrodes are energized due to the phenomenon in which the water is swayed or bounced, and therefore, the ice-making groove is mistakenly recognized as being full of ice-making water.

SUMMARY OF THE DISCLOSURE

An object of the present disclosure is to provide an ice maker, a refrigerator, and a method for controlling the same, which can accurately detect whether the ice-making water accommodated in an ice-making groove is full.

Another object of the present disclosure is to provide an ice maker, a refrigerator, and a method for controlling the same, which can accurately detect whether the ice-making water accommodated in an ice-making groove is full by using a change value of a capacitance value from the start of water supply to an ice-making groove up to a setting time without using a limit value of the capacitance value detected by a sensor.

The object of the present disclosure is not limited to the aforementioned objects, and other objects not mentioned can be clearly understood to those skilled in the art from the following description.

To achieve the objects, an ice maker according to the present disclosure is composed of a control box, an ice tray, a water supply unit, and a detecting unit. The control box has a control unit disposed therein. The ice tray is disposed on one side surface of the control box. The ice tray is formed with an ice-making groove in which ice-making water is accommodated. The water supply unit supplies the ice-making water to the ice-making groove. The detecting unit detects the water level of the ice-making water accommodated in the ice-making groove. The detecting unit is composed of a sensor housing, a sensor, and a connector wire. The sensor housing is formed of a non-conductor. The sensor housing is spaced apart from the ice tray and installed on one side surface of the control box. One side surface of the sensor housing is formed with a water level measuring hole into which the ice-making water in the ice-making groove flows.

The sensor is in contact with the ice-making water flowing into the sensor housing through the water level measuring hole to detect the water level of the ice-making water.

One end of the connector wire is connected to the sensor. The other end of the connector wire is connected to the control unit.

The sensor can be a temperature sensor or a capacitance sensor. Therefore, the detecting unit can achieve the temperature sensor and the capacitance sensor as one structure.

An upper surface of the sensor housing can be formed with a sensor inserting groove communicating with the water level measuring hole. The sensor can be inserted into a sensor inserting groove.

One side surface of the sensor housing can be disposed on the same plane as one side surface of the control box. Therefore, the detecting unit cannot interfere with an ice discharge path of the ice tray.

The inside of the sensor housing can be insulated and waterproofed by a filling material such as epoxy or urethane.

The sensor housing can be composed of a housing main body and a mounting unit. The housing main body can be formed with the sensor inserting groove and the water level measuring hole. The mounting unit can extend horizontally from an upper end of the housing main body. One side surface of the mounting unit can be formed with a sensor inserting guide groove extending upward from the sensor inserting groove.

One end of the connector wire connected to the sensor can be disposed in the sensor inserting guide groove.

One side surface of the mounting unit can be formed with a wire accommodating groove extending horizontally from the sensor inserting guide groove and having a part of the connector wire accommodated therein.

The control unit can control the water supply unit to stop the water supply or additionally supply the water to the ice-making groove using a change value of a capacitance value detected by the sensor after a setting time after the sensor detects an initial value of the capacitance.

The control unit can perform the stop of the water supply or the additional water supply by the set number of times again.

After the setting time after the water supply unit starts the water supply to the ice-making groove, the control unit can control the water supply unit to stop the water supply to the ice-making groove when the change value of the capacitance value is equal to or larger than a first setting value.

After the water supply unit starts the water supply to the ice-making groove, the control unit can control the water supply unit to additionally supply the water to the ice-making groove when the change value of the capacitance value is smaller than the first setting value.

After the setting time after the water supply unit additionally supplies the water to the ice-making groove, the control unit can control the water supply unit to stop the additional water supply to the ice-making groove when the change value of the capacitance value is equal to or larger than a second setting value that is larger than the first setting value.

After the setting time after the water supply unit additionally supplies the water to the ice-making groove, the control unit can control the water supply unit to additionally supply the water to the ice-making groove when the change value of the capacitance value is smaller than the second setting value.

The ice maker according to the present disclosure is composed of an ice tray, a water supply unit, a capacitance sensor, and a control unit. The ice tray is formed with an ice-making groove in which ice-making water is accommodated. The water supply unit supplies the ice-making water to the ice-making groove. The capacitance sensor detects the water level of the ice-making water accommodated in the ice-making groove. The control unit controls the water supply unit to stop the water supply or additionally supply the water to the ice-making groove using the change value of the capacitance value detected by the capacitance sensor after the setting time after the capacitance sensor detects an initial value of the capacitance value.

A refrigerator according to the present disclosure includes the ice maker.

A method for controlling the ice maker according to the present disclosure is a method for controlling an ice maker composed of an ice tray, a water supply unit, and a capacitance sensor. The ice tray is formed with an ice-making groove in which ice-making water is accommodated. The water supply unit supplies the ice-making water to the ice-making groove. The capacitance sensor detects the water level of the ice-making water accommodated in the ice-making groove. The method for controlling the ice maker according to the present disclosure is composed of supplying water, and additionally supplying the water or stopping the water supply. In the supplying of the water, the water supply unit starts the water supply to the ice-making groove. In the additionally supplying of the water or stopping of the water supply, the water supply unit stops the water supply or additionally supplies the water to the ice-making groove using the change value of the capacitance value detected by the capacitance sensor after the setting time after the capacitance sensor detects the initial value of the capacitance value.

The additionally supplying of the water or stopping of the water supply can be performed again by the set number of times.

In the additionally supplying of the water or stopping of the water supply, the water supply unit can stop the water supply to the ice-making groove when the change value of the capacitance value is equal to or larger than a first setting value.

In the additionally supplying of the water or stopping of the water supply, the water supply unit can start the additional water supply to the ice-making groove when the change value of the capacitance value is smaller than the first setting value.

After the setting time after starting the water supply, the water supply unit can stop the additional water supply to the ice-making groove when the change value of the capacitance value is equal to or larger than a second setting value that is larger than the first setting value.

After the setting time after starting the water supply, the water supply unit can additionally supply the water to the ice-making groove when the change value of the capacitance value is smaller than the second setting value.

Specific matters according to other exemplary embodiments are included in the detailed description and drawings.

The ice maker, the refrigerator, and the control method thereof according to the present invention have the effect of accurately detecting the water level of the ice-making water accommodated in the ice-making groove of the ice tray using a sensor.

In addition, it is possible to accurately detect whether the ice-making water accommodated in the ice-making groove is full by using the change value of the capacitance value detected by the sensor from the start of water supply to the ice-making groove up to the set time.

The effect of the present disclosure is not limited to the aforementioned effects, and other effects not mentioned can be clearly understood to those skilled in the art from the description of the claims.

DETAILED DESCRIPTION

Hereinafter, an ice maker, a refrigerator, and a method for controlling the same according to exemplary embodiments of the present disclosure will be described with reference to the drawings.

Figure 1:
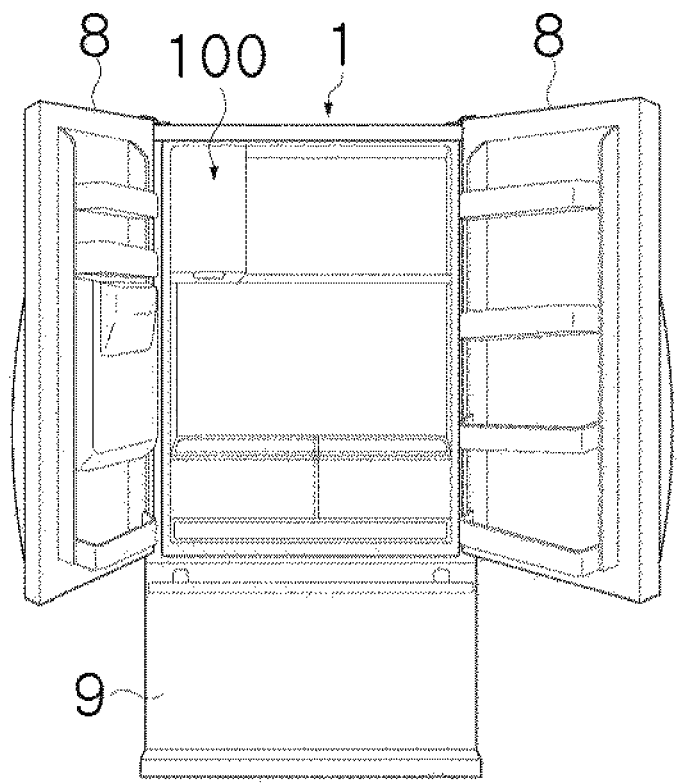
FIG. 1 is a diagram showing a refrigerator installed with an ice maker according to a first exemplary embodiment of the present disclosure.

FIG. 1 is a diagram showing a refrigerator installed with an ice maker according to a first exemplary embodiment of the present disclosure.

Referring to FIG. 1, a refrigerator 1 according to a first exemplary embodiment of the present disclosure can include an ice maker 100.

The refrigerator 1 can include a cabinet forming a storage compartment with an open front surface, and at least one door 8, 9 configured to open or close the opened front surface of the storage compartment.

The storage compartment can include at least one of a refrigerating compartment storing food in a refrigerated state and a freezing compartment storing food in a frozen state. The refrigerator 1 according to the first exemplary embodiment is described as including both the refrigerating compartment and the freezing compartment, and the refrigerating compartment can be provided above the freezing compartment.

The doors 8, 9 can include a refrigerating compartment door 8 configured to open or close the refrigerating compartment and a freezing compartment door 9 configured to open or close the freezing compartment. Two refrigerating compartment doors 8 disposed on the left and right are provided, in which the left refrigerating compartment door can open or close the left that is a part of the refrigerating compartment, and the right refrigerating compartment door 8 can open or close the right that is the rest of the refrigerating compartment.

The ice maker 100 can be installed in at least one of the refrigerating compartment and the freezing compartment. The refrigerator 1 according to the first exemplary embodiment can have the ice maker 100 installed in an upper left of the refrigerating compartment.

The ice maker 100 can receive ice-making water from the refrigerator 1, and convert the ice-making water into ice by the cold air supplied to the storage compartment from a refrigeration cycle circuit of the refrigerator 1 to manufacture the ice.

An ice box can be disposed below the ice maker 100 in the storage compartment of the refrigerator 1. The ice completed in the ice maker 100 can be removed and stored in the ice box.

Meanwhile, the ice maker 100 can be largely classified into two types according to a method for removing the ice completed in the ice making groove of the ice tray from the ice making groove. In other words, as shown in FIGS. 2 and 3, the ice maker 100 can include an ejector-type ice maker 100 including an ejector 126, and although not shown, a twist-type ice maker.

The ejector-type ice maker 100 is a method in which when the ejector 126 is rotated in a circumferential direction, an eject pin 127 formed on a circumferential surface of an ejector 126 pushes and removes the ice, and the twist-type ice maker is a method in which when the ice making is completed in the ice tray, the ice tray is twisted to remove the ice.

Hereinafter, the ice maker 100 according to the first exemplary embodiment of the present disclosure will be described as, for example, the ejector-type ice maker 100, but can include the twist-type ice maker.

Figure 2:
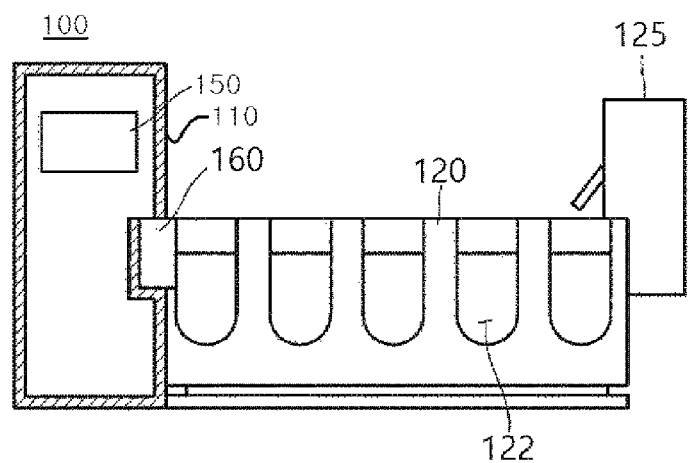
FIG. 2 is a schematic side cross-sectional diagram showing the ice maker shown in FIG. 1.
Figure 3:
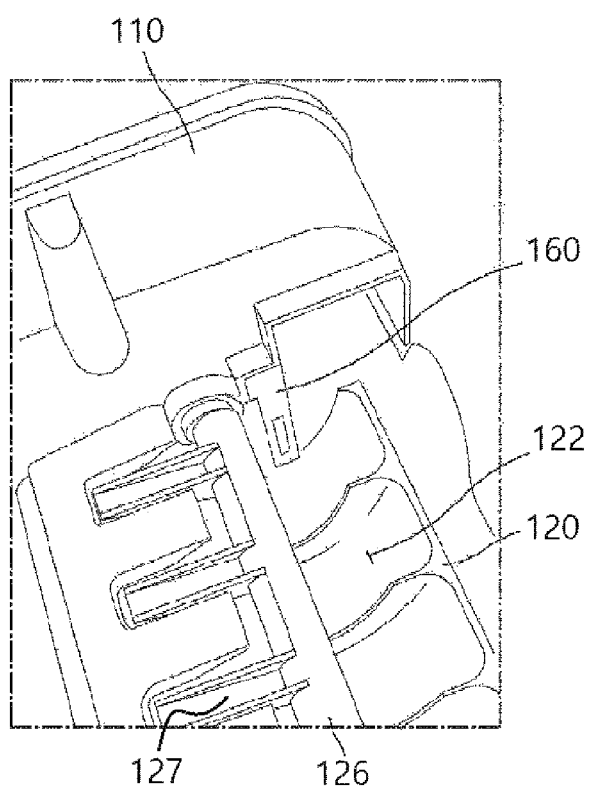
FIG. 3 is a schematic perspective diagram showing a part of the ice maker shown in FIG. 1.

FIG. 2 is a schematic cross-sectional side diagram showing the ice maker shown in FIG. 1, and FIG. 3 is a schematic perspective diagram showing a part of the ice maker shown in FIG. 1.

Referring to FIGS. 1 to 3, the ice maker 100 according to the first exemplary embodiment of the present disclosure can include an ice tray 120, an ejector 126, and a control box 110.

An ice-making groove 122 can be formed in an upper surface of the ice tray 120. The ice making groove 122 can be a space that becomes ice after the ice-making water is filled. The ice-making groove 122 can be formed of a plurality of ice-making grooves 122 spaced apart from each other in a longitudinal direction of the ice tray 120.

When the ice tray 120 is subjected to a press processing so that a part of an upper surface of the ice tray 120 is concave and a part of a lower surface of the ice tray 120 is convex, a part of the concave upper surface of the ice tray 120 can become the ice-making groove 122.

The ice-making water can be supplied to the ice-making groove 122 from a water supply unit 125 installed on one side of the ice tray 120. The water supply unit 125 can include a water supply valve, and the water supply valve is controlled to be opened or closed by a control unit 150 to be described later, and therefore, the water supply unit 125 can supply water to the ice-making groove 122 or stop the supply of water. Hereinafter, in the description, the meaning that the control unit 150 controls the water supply unit 125 can be the same as the meaning that the control unit 150 controls the water supply valve.

When cold air is supplied to the storage compartment of the refrigerator 1 after the ice-making water is supplied to the ice-making groove 122, the ice-making water supplied to the ice-making groove 122 can exchange heat with the cold air in the storage compartment of the refrigerator 1 to become ice.

The ice tray 120 can be disposed on one side surface of the control box 110. The ice tray 120 can be disposed to protrude horizontally from one side surface of the control box 110. The ice tray 120 can be formed to be horizontally elongated. A slit into which one end of the ice tray 120 in the longitudinal direction is inserted can be formed on one side of the control box 110. One end of the ice tray 120 in the longitudinal direction can be inserted into the slit formed in one side of the control box 110 and coupled to the control box 110.

The ejector 126 can separate the ice made in the ice-making groove 122 from the ice-making groove 122. After ice is made in the ice-making groove 122 of the ice tray 120, the ejector 126 can remove the ice in the ice-making groove 122 from the ice-making groove 122.

The ejector 126 can be formed as a long axis horizontally disposed on one side of the control box 110. The ejector 126 can be disposed to be spaced apart from the ice tray 120 upward.

An eject pin 127 can be formed to protrude from a circumferential surface of the ejector 126. The eject pin 127 can be formed to protrude in a radial direction of the ejector 126. When the ejector 126 is rotated in the circumferential direction, an end of the eject pin 127 is inserted into the ice-making groove 122, and therefore, the ice in the ice-making groove 122 can be removed from the ice-making groove 122. When the ejector 126 rotates, the eject pin 127 can push the ice in the ice-making groove 122 to remove the ice from the ice-making groove 122.

The eject pin 127 can be formed of a plurality of eject pins 127 spaced apart from each other in the longitudinal direction of the ejector 126. The eject pins 127 can be formed in the same as the number of ice-making grooves 122 formed in the ice tray 120. The plurality of eject pins 127 can be disposed at positions corresponding to the plurality of ice-making grooves 122.

Meanwhile, the ice made in the ice-making groove 122 of the ice tray 120 can be disposed in a state of being fixed to the ice-making groove 122. Therefore, when the eject pin 127 removes the ice made in the ice-making groove 122 from the ice-making groove 122, the ice cannot be easily removed from the ice-making groove 122.

When the eject pin 127 removes the ice made in the ice-making groove 122 from the ice-making groove 122, a lower surface of the ice tray 120 can be installed with an ice-removing heater (not shown) to allow the ice to be easily removed from the ice-making groove 122.

The ice-removing heater can generate heat before the eject pin 127 removes the ice made in the ice-making groove 122 from the ice-making groove 122. The ice-removing heater can supply heat to the ice-making groove 122 to slightly melt the ice in the ice-making groove 122. The ice-removing heater can slightly melt the ice in the ice-making groove 122 so that the ice made in the ice-making groove 122 can be easily removed by the eject pin 127.

A control unit 150 can be disposed in the control box 110. In addition, an ice-removing motor (not shown) configured to rotate the ejector 126 in the circumferential direction of the ejector 126 can be disposed in the control box 110. The ice-removing heater and the ice-removing motor can be controlled by the control unit 150.

After the ice is made in the ice-making groove 122, the control unit 150 can control the ice-removing heater to generate heat to slightly melt the ice fixed to the ice-making groove 122. Thereafter, the control unit 150 can control the ice-removing motor to cause the ice-removing motor to rotate the ejector 126, so that the eject pin 127 can remove the ice from the ice-making groove 122.

A rotating axis of the ice-removing motor can be coupled to the ejector 126 through a coupler. The ejector 126 can extend toward the rotating axis of the ice-removing motor. In this case, the ejector 126 can be disposed on the same axis as the rotating axis of the ice-removing motor. Alternatively, the rotating axis of the ice-removing motor can be connected to the ejector 126 through a plurality of gears, and therefore, a rotation force of the rotating axis of the ice-removing motor can also be delivered to the ejector 126 through the plurality of gears. In this case, the ejector 126 can be disposed on an axis different from the rotating axis of the ice-removing motor.

The ice-removing heater can be formed of a U-shaped tube that is heat-generated by a hot gas flowing into the ice-removing heater. In this case, the control unit 150 can control a hot gas valve to supply or cut off the hot gas into the ice-removing heater, so that the hot gas is supplied or blocked into the ice-removing heater.

Alternatively, the ice-removing heater can also be formed of a hot wire or a planar heater that is heat-generated by electricity input to the ice-removing heater. In this case, the control unit 150 can control a current supply switch that supplies or cuts off the electricity to the ice-removing heater, so that the electricity is supplied or cut off to the ice-removing heater.

Meanwhile, the control unit 150 can also be provided in the ice maker 100, also be provided in the refrigerator 1, or also be provided in both the ice maker 100 and the refrigerator 1. In other words, the control unit 150 can be provided in at least one of the refrigerator 1 and the ice maker 100. The control unit 150 can include a refrigerator control unit provided in the refrigerator 1 and an ice maker control unit provided in the ice maker 100. The ice maker 100 can also be operated by receiving a control signal from the refrigerator control unit, or also be operated through a control signal from the ice maker control unit. The ice maker control unit can receive an ice-removing signal from the refrigerator control unit to control the ice-removing motor 135. The control power source of the ice maker control unit can be supplied from the refrigerator control unit.

Meanwhile, the ice maker 100 according to the first exemplary embodiment of the present disclosure can further include a detecting unit 160. The detecting unit 160 can detect the water level of the ice-making water accommodated in the ice-making groove 122. The detecting unit 160 can be disposed on one end of the ice tray 120 in the longitudinal direction. The water supply unit 125 can be disposed on the other end of the ice tray 120 in the longitudinal direction.

At least a part of the detecting unit 160 can be disposed to be inserted into the ice-making groove 122 positioned farthest from the water supply unit 125 among the plurality of ice-making grooves 122 to detect the water level of the ice-making water accommodated in the ice-making groove 122. In other words, the water supply unit 125 can supply water to the ice-making groove 122 positioned farthest from the detecting unit 160 among the plurality of ice-making grooves 122, and the ice-making water thus supplied from the water supply unit 125 can be moved to the adjacent ice-making groove 122 along a flow path (not shown) connecting the plurality of ice-making grooves 122 and moved to the ice-making groove 122 positioned farthest from the water supply unit 125, which is the ice-making groove 122 in which the detecting unit 160 is positioned. The detecting unit 160 can detect the water level of the ice-making water accommodated in the ice-making groove 122 positioned farthest from the water supply unit 125 among the plurality of ice-making grooves 122, thereby detecting the water level of the ice-making water accommodated in the plurality of ice-making grooves 122.

Hereinafter, the detecting unit 160 will be described in detail.

Figure 4:
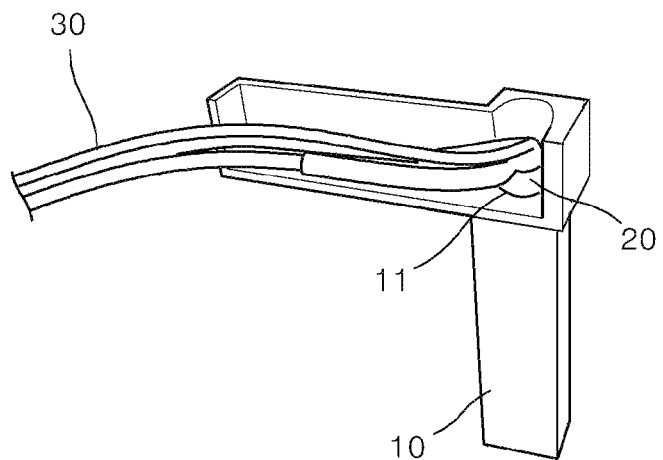
FIG. 4 is a rear coupled perspective diagram showing a state where a detecting unit shown in FIG. 3 is separated from a control box.
Figure 5:
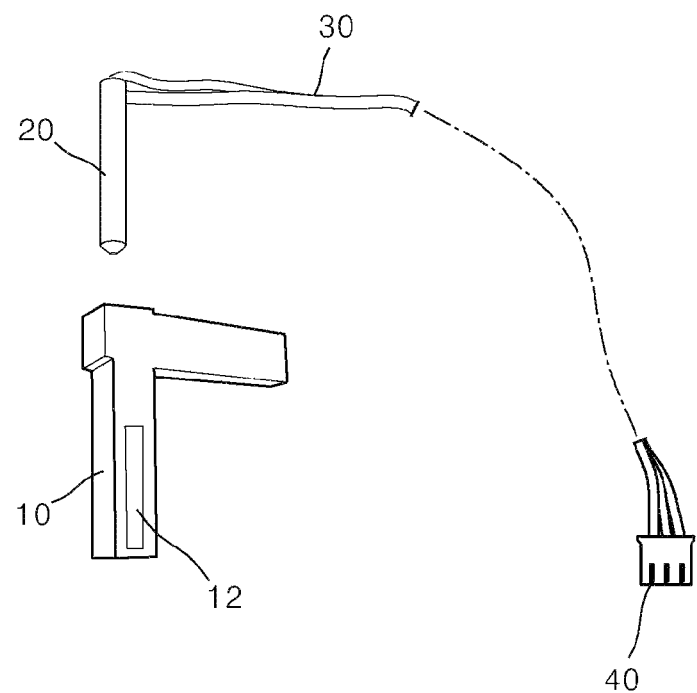
FIG. 5 is a front exploded perspective diagram showing the detecting unit shown in FIG. 4.
Figure 6:
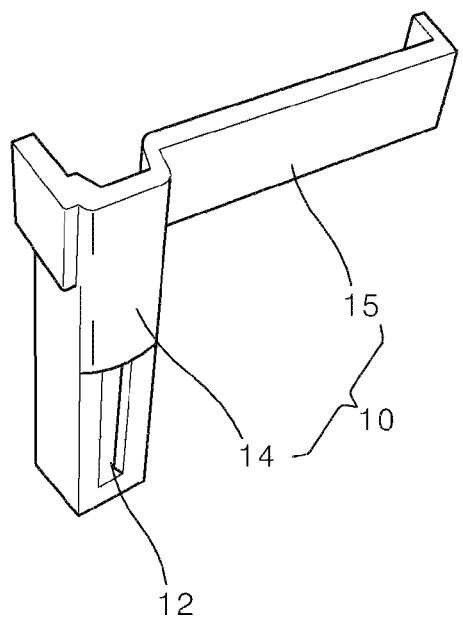
FIG. 6 is a front perspective diagram showing a sensor housing shown in FIG. 5.
Figure 7:
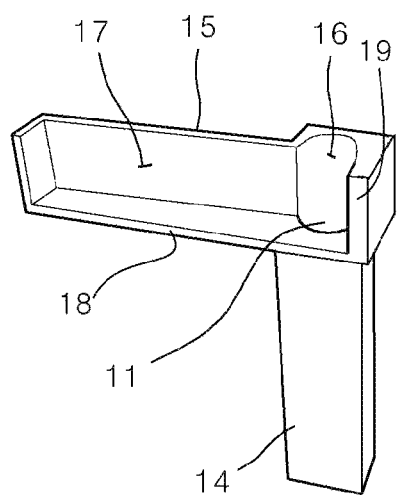
FIG. 7 is a rear perspective diagram showing the sensor housing shown in FIG. 5.
Figure 8:
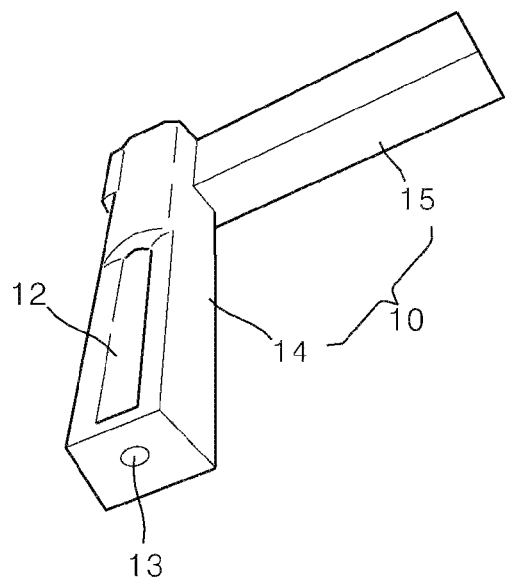
FIG. 8 is a bottom perspective diagram showing the sensor housing shown in FIG. 5.

FIG. 4 is a rear coupled perspective diagram showing a state where a detecting unit shown in FIG. 3 is separated from a control box, FIG. 5 is a front exploded perspective diagram showing the detecting unit shown in FIG. 4, FIG. 6 is a front perspective diagram showing a sensor housing shown in FIG. 5, FIG. 7 is a rear perspective diagram showing the sensor housing shown in FIG. 5, and FIG. 8 is a bottom perspective diagram showing the sensor housing shown in FIG. 5.

Referring to FIGS. 4 to 8, the detecting unit 160 can include a sensor housing 10 and a sensor 20. The sensor housing 10 can be formed of a non-conductor, and the sensor 20 can be formed of a conductor.

The sensor housing 10 can be spaced apart from the ice tray 120 and installed on one side surface of the control box 110.

The sensor 20 can also be a capacitive sensor or also be a temperature sensor. In other words, the detecting unit 160 can achieve the temperature sensor and the capacitive sensor as one structure.

The sensor 20 can be spaced apart from the ice tray 120 by the sensor housing 10. Therefore, the detecting unit 160 can be spaced apart from the ice tray 120 even without separate non-conductor.

One side surface of the sensor housing 10 can be disposed on the same plane as one side surface of the control box 110. Therefore, the detecting unit 160 cannot interfere with an ice discharging path of the ice tray 120.

The inside of the sensor housing 10 can be insulated and waterproofed by a filling material such as epoxy or urethane.

Hereinafter, while the sensor 20 will be described as being limited to the capacitive sensor 20, the sensor 20 can include all sensors that can be in direct contact with the ice-making water accommodated in the ice-making groove 122 to detect the water level of the ice-making water.

A sensor inserting groove 11 can be formed in an upper surface of the sensor housing 10. The capacitive sensor 20 can be inserted into the sensor inserting groove 11. The sensor inserting groove 11 and the capacitive sensor 20 can be formed to be vertically elongated. A vertical length of the sensor inserting groove 11 can be formed to be slightly shorter than the vertical length of the capacitive sensor 20. When the capacitive sensor 20 is in a state of being inserted into the sensor inserting groove 11, an upper end of the capacitive sensor 20 can be disposed to protrude from the upper end of the sensor inserting groove 11.

A water level measuring hole 12 can be formed in one side surface of the sensor housing 10. The water level measuring hole 12 can be formed on a front surface of the sensor housing 10 to be vertically elongated. The water level measuring hole 12 can be formed on a front surface of a housing main body 14 to be described later to be vertically elongated. The capacitive sensor 20 can be in contact with the ice-making water flowing into the sensor housing 10 through the water level measuring hole 12 to detect the water level of the ice-making water accommodated in the ice-making groove 122.

The water level measuring hole 12 can communicate the ice-making groove 122 and the sensor inserting groove 11. Therefore, since the ice-making water in the ice-making groove 122 can flow into the sensor inserting groove 11 through the water level measuring hole 12, the capacitive sensor 20 disposed in the sensor inserting groove 11 can be in contact with the ice-making water accommodated in the ice-making groove 122 to detect the water level of the ice-making water.

The sensor housing 10 can have a mold pinhole 13 further formed in a portion corresponding to the lower end of the capacitive sensor 20. The mold pinhole 13 can be formed on a bottom surface of the sensor inserting groove 11. The mold pinhole 13 can be formed by a mold pin formed in the mold when the sensor housing 10 is molded in the mold.

The water pressure of a water supply pipe installed in the building of each household can be different for each household.

Therefore, in a household where the water pressure of the water supply pipe is high, since the water pressure supplied by the water supply unit 125 to the ice-making groove 122 of the ice tray 120 is high, the ice-making water supplied from the water supply unit 125 into the ice-making groove 122 can be swayed by the water pressure or the ice-making water supplied to the ice-making groove 122 can be bounced by the capacitive sensor 20.

In addition, even when an external shock is applied to the ice maker 100, the ice-making water accommodated in the ice-making groove 122 can be swayed or the ice-making water supplied to the ice-making groove 122 can be bounced toy the capacitive sensor 20.

Due to the phenomenon in which the ice-making water accommodated in the ice-making groove 122 is swayed or the ice-making water is bounced to the capacitive sensor 20, the capacitive sensor 20 cannot accurately detect the water level of the ice-making groove 122.

The sensor housing 10 can include the housing main body 14 and a mounting unit 15.

The sensor inserting groove 11 and the water level measuring hole 12 can be formed in the housing main body 14. The mold pinhole 13 can be further formed in a lower surface of the housing main body 14.

The mounting unit 15 can extend horizontally from an upper end of the housing main body 14. The mounting unit 15 can extend in a direction perpendicular to the housing main body 14.

The mounting unit 15 can be coupled to one side surface of the control box 110. Here, one side surface of the control box 110 can be a surface on which the ice tray 120 is disposed to protrude horizontally. One side surface of the control box 110 can be opened, and the mounting unit 15 can cover the opened side surface of the control box 110.

A sensor inserting guide groove 16 extending upward from the sensor inserting groove 14 can be formed in one side surface of the mounting unit 15. The sensor inserting guide groove 16 can be concavely formed on a rear surface of the sensor housing 10. The sensor inserting guide groove 16 can be concavely formed on a rear surface of the mounting unit 15. When an operator inserts the capacitive sensor 20 into the sensor inserting groove 11, he/she can easily insert the capacitive sensor 20 into the sensor inserting groove 11 through the sensor inserting guide groove 16.

The ice maker 100 according to the first exemplary embodiment of the present disclosure can further include a connector wire 30 connected to the capacitive sensor 20. The connector wire 30 can be formed of a plurality of wires.

One end of the connector wire 30 can be connected to the capacitive sensor 20, and the other end of the connector wire 30 can be connected to the control unit 150. A connector 40 connected to the control unit 150 can be provided on the other end of the connector wire 30. Therefore, the signal detected by the capacitive sensor 20 can be input to the control unit 150 through the connector wire 30 and the connector 40.

One end of the connector wire 30 connected to the capacitive sensor 20 can be disposed in the sensor inserting guide groove 16.

A wire accommodating groove 17 extending horizontally from the sensor inserting guide groove 16 and having a part of the connector wire 30 accommodated therein can be formed on one side surface of the mounting unit 15. The wire accommodating groove 17 can be concavely formed on the rear surface of the sensor housing 10. The wire accommodating groove 17 can be concavely formed on the rear surface of the mounting unit 15.

The sensor inserting guide groove 16 and the wire accommodating groove 17 can be formed to have opened upper sides. As shown in FIG. 7, a lower boundary surface 18 between the sensor inserting guide groove 16 and the wire accommodating groove 17 of the mounting unit 15, and one side boundary surface 19 extending from the sensor inserting guide groove 16 can be formed to protrude outward from the housing main body 14, and at least some of the protruding boundary surfaces 18, 19 can be supported by the upper end of the ice tray 120.

Figure 9:
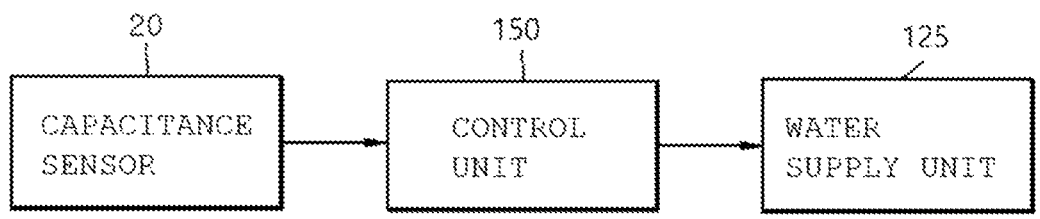
FIG. 9 is a control block diagram of the ice maker according to the first exemplary embodiment of the present disclosure.

FIG. 9 is a control block diagram of the ice maker according to the first exemplary embodiment of the present disclosure.

Referring to FIG. 9, the control unit 150 can control the water supply unit 125 using the capacitance detected by the capacitive sensor 20. In other words, the capacitive sensor 20 can detect the capacitance caused by the ice-making water supplied to the ice-making groove 122 to input it to the control unit 150, and the control unit 150 can control the water supply unit 125 so that the water supply unit 125 supplies the water or stops the water supply to the ice-making groove 122 using the capacitance input from the capacitance sensor 20.

In the control unit 150, a limit value of the capacitance value detected by the capacitive sensor 20 is not set, and a value for comparing with a change value of the capacitance value detected by the capacitance sensor 20 from the start of the water supply to the ice-making groove 122 by the water supply unit 125 up to a setting time can be set.

If the control unit 150 determines whether the ice-making water supplied to the ice-making groove 122 is full using the set limit value, the capacitance sensor 20 accurately cannot detect the water level of the ice-making groove 122 if the ice-making water flows into the capacitance sensor 20 due to the phenomenon in which the ice-making water is swayed or the ice-making water is bounced as described above.

To prevent such a problem, the control unit 150 can determine whether the ice-making water is full in the ice-making groove 122 using the change value of the capacitance value detected by the capacitance sensor 20 from the start of the water supply to the ice-making groove 122 by the water supply unit 125 up to the setting time.

As the result of determining whether the water is full, the control unit 150 can control the water supply unit 125 so that the water supply unit 125 stops the water supply to the ice-making groove 122 if the water is full.

In addition, as the result of determining whether the water is full, the control unit 150 can control the water supply unit 125 so that the water supply unit 125 additionally supplies the water to the ice-making groove 122 if the water is not full.

The control unit 150 can perform the determination of whether the water is full, the stop of the water supply, or the additional water supply by the set number of times again. According to the first exemplary embodiment, the set number of times can be twice, but is not limited to twice.

Figure 10:
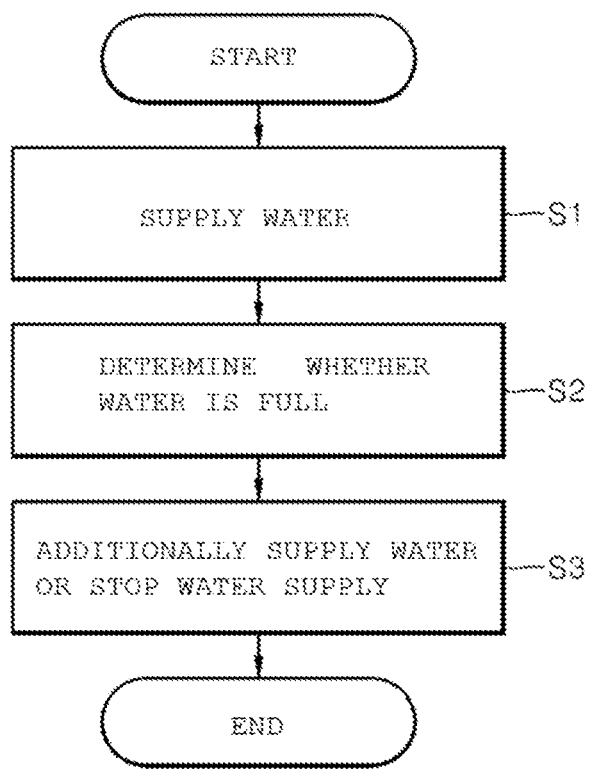
FIG. 10 is a flowchart according to a control method of the ice maker according to the first exemplary embodiment of the present disclosure.
Figure 11:
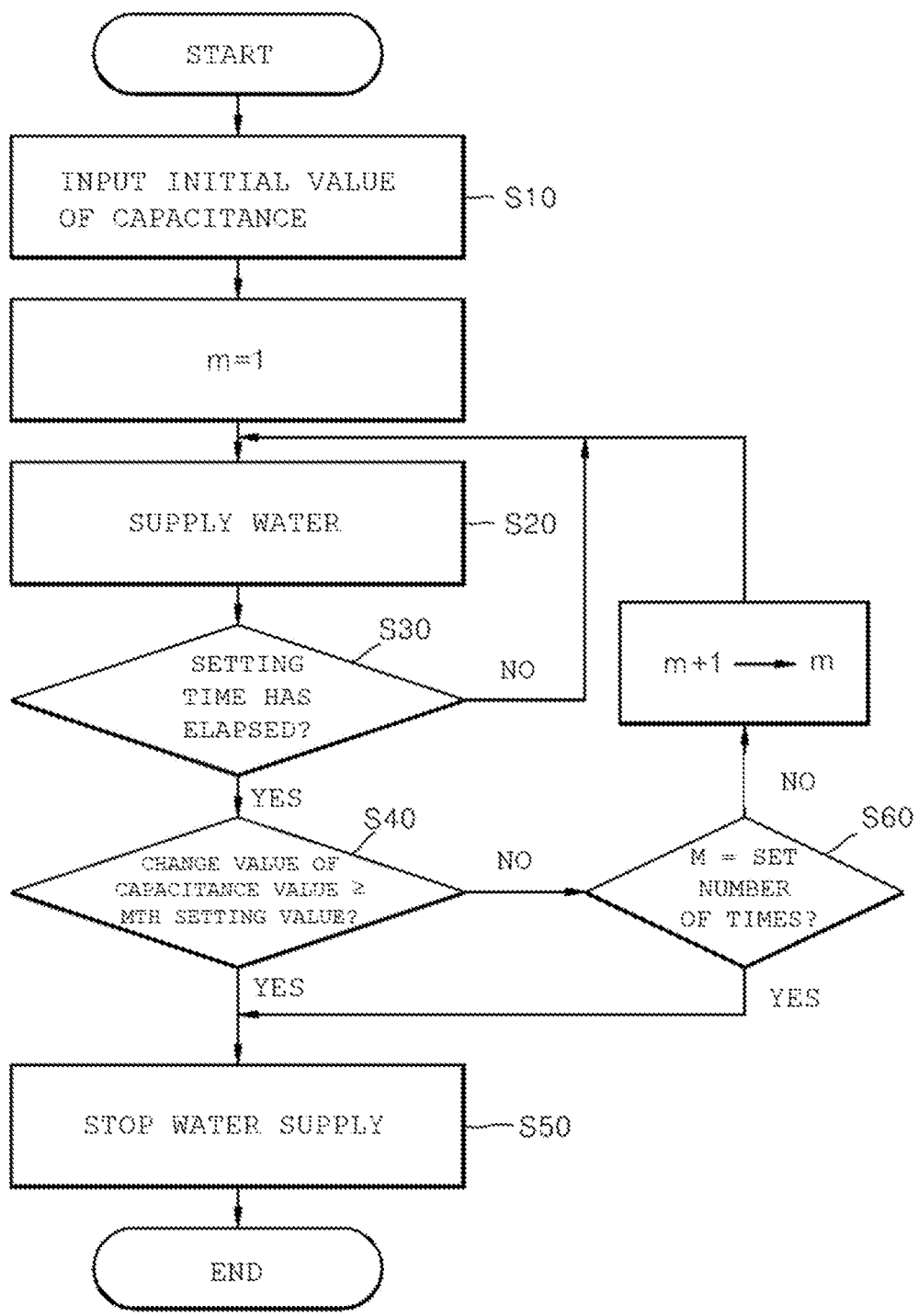
FIG. 11 is a detailed flowchart according to the control method of the ice maker according to the first exemplary embodiment of the present disclosure.

FIG. 10 is a flowchart according to a control method of the ice maker according to the first exemplary embodiment of the present disclosure, and FIG. 11 is a detailed flowchart according to the control method of the ice maker according to the first exemplary embodiment of the present disclosure. Here, a method for controlling the ice maker according to the first exemplary embodiment of the present disclosure will be described in connection with the operation of the ice maker according to the first exemplary embodiment of the present disclosure.

Referring to FIGS. 10 and 11, a method for controlling the ice maker according to the present disclosure can include supplying the water (S1), determining whether the water is full (S2), and additionally supplying the water or stopping the water supply (S3).

In the supplying of the water (S1), the capacitance sensor 20 can input an initial value of the detected capacitance to the control unit (S10).

In the supplying of the water (S1), the control unit 150 can control the water supply unit 125 so that the water supply unit 125 starts the water supply to the ice-making groove 122 when the initial value of the capacitance input from the capacitance sensor 20 is equal to or smaller than a setting value. In other words, in the supplying of the water (S1), the control unit 150 can control the water supply unit 125 to start the water supply when the initial value of the capacitance input from the capacitive sensor 20 is equal to or smaller than the setting value (S20).

In the determining of whether the water is full (S2), the control unit 150 can determine whether the setting time has elapsed since the water supply unit 125 started the water supply (S30).

In the determining of whether the water is full (S2), the control unit 150 can additionally supply the water when it is determined that the setting time has not elapsed since the water supply unit 125 started the water supply (S20).

In the determination of whether the water is full (S2), after the setting time after the supplying of the water (S1), the control unit 150 can determine whether the ice-making water is full in the ice-making groove 122 using the change value of the capacitance value detected by the capacitance sensor 20 up to the setting time in the supplying of the water (S1). In other words, after the setting time after the capacitance sensor 20 detects the initial value of the capacitance, the control unit 150 can control the water supply unit 125 to stop the water supply or additionally supply the water to the ice-making groove 122 using the change value of the capacitance value detected by the capacitance sensor 20.

In other words, when it is determined that the set time has elapsed since the water supply unit 125 started supplying water in the water full determination step (S2), the control unit 150 can determine whether the change value of the capacitance value detected by the capacitance sensor 20 from the start of the water supply by the water supply unit 125 up to the setting time is equal to or larger than the first setting time (S40).

In the additionally supplying of the water or stopping of the water supply (S3), as the result of determining of whether the water is full (S2), the control unit 150 can control the water supply unit 125 to stop the water supply to the ice-making groove 122 if the water is full, and the water supply unit 125 to additionally supply the water to the ice-making groove 122 if the water is not full.

In other words, in the additionally supplying of the water or stopping of the water supply (S3), the control unit 150 can stop the water supply when the change value of the capacitance value detected by the capacitance sensor 20 from the start of the water supply by the water supply unit 125 up to the setting time is equal to or larger than the first setting value (S50).

In addition, in the additionally supplying of the water or stopping of the water supply (S3), the control unit 150 can start the additional water supply when the change value of the capacitance value detected by the capacitance sensor 20 from the start of the water supply by the water supply unit 125 up to the setting time is smaller than the first setting value (S20).

The determining of whether the water is full (S2) and the additionally supplying of the water or stopping of the water supply (S3) can be performed by the set number of times again. In other words, in the additionally supplying of the water or stopping of the water supply (S3), the control unit 150 can determine whether the first setting value is a setting value of the set number of times when the change value of the capacitance value detected by the capacitance sensor 20 from the start of the water supply by the water supply unit 125 up to the setting time is smaller than the first setting value (S60).

In the additionally supplying of the water or stopping of the water supply (S3), the control unit 150 can start the additional water supply when the first setting value is not the setting value of the set number of times (S20).

In addition, in the additionally supplying of the water or stopping of the water supply (S3), the control unit 150 can stop the water supply if the first setting value is not the set number of times (S50).

After starting the additional water supply, the control unit 150 can determine again whether the setting time has elapsed (S30). As the result of the determination, if the setting time has not elapsed, the additional water supply can continue (S20).

In addition, as the result of the determination, if the setting time has elapsed, the control unit 150 can determine whether the change value of the capacitance value is equal to or larger than the second setting value (S40). In other words, after the setting time after starting the additional water supply, the control unit 150 can determine whether the change value of the capacitance value is equal to or larger than the second setting value.

As the result of the determination, when the change value of the capacitance value is equal to or larger than the second setting value, the control unit 150 can control the water supply unit 125 to stop the additional water supply to the ice-making groove 122.

The second setting value can be a value larger than the first setting value. In other words, after the water supply unit 125 starts the water supply to the ice-making groove 122, the capacitance value detected by the capacitive sensor 20 can be highly detected over time. This is because as the ice-making water is filled in the ice-making groove 122, the area in which the ice-making water accommodated in the ice-making groove 122 is in contact with the capacitive sensor 20 increases, and the capacitance value detected by the capacitance sensor 20 is proportional to the contact area with the ice-making water. Therefore, it is preferable that as the time elapses after the water supply unit 125 starts the water supply to the ice-making groove 122, the control unit 150 determines whether the ice-making water is full in the ice-making groove 122 by comparing the change value of the capacitance value detected by the capacitance sensor 20 with a high setting value.

Meanwhile, after the setting time after starting the additional water supply, the control unit 150 can control the water supply unit 125 to additionally supply the water to the ice-making groove 122 when the change value of the capacitance value is smaller than the second setting value.

As described above, the ice maker, the refrigerator, and the method for controlling the same according to exemplary embodiments of the present disclosure can accurately detect the water level of the ice-making water accommodated in the ice-making groove 122 of the ice tray 120 using the capacitive sensor 20.

In addition, the ice maker, the refrigerator, and the method for controlling the same according to exemplary embodiments of the present disclosure can accurately detect whether the ice-making water accommodated in the ice-making groove 122 is full using the change value of the capacitance value detected by the capacitance sensor 20 from the start of the water supply to the ice-making groove 122 up to the setting time.

Figure 12:
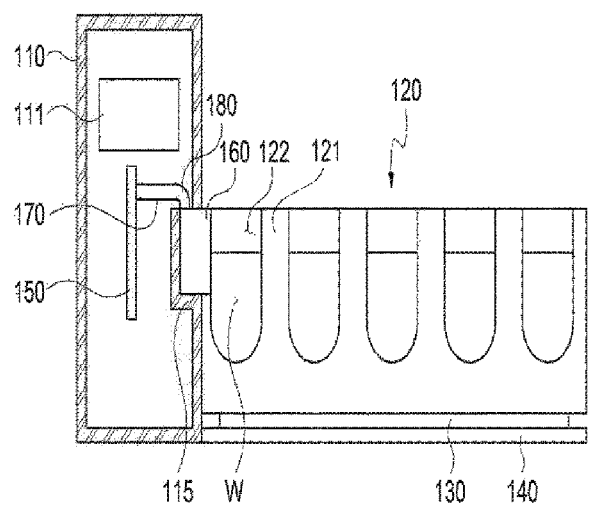
FIG. 12 is a diagram showing an ice maker according to a second exemplary embodiment of the present disclosure.

FIG. 12 is a diagram showing an ice maker according to a second exemplary embodiment of the present disclosure.

Referring to FIG. 12, the ice maker according to the second exemplary embodiment of the present disclosure can include the ice tray 120, an ejector (not shown), and the control box 110.

The ice tray 120 can have a predetermined inner surface 121 formed therein, and have a plurality of ice-making grooves 122 for accommodating water. A plurality of partition walls can be formed in the ice tray 120 to be separated into a plurality of ice-making grooves 122. At this time, each of the separated ice-making grooves 122 in the ice tray 120 can be formed to correspond to an eject pin of the ejector. The inner circumferential surface of the ice tray 120 can be provided in a semi-circular arc shape having the radius corresponding to the length of the eject pin so that the eject pin rotates to remove ice.

The ejector can serve to remove the ice in the ice tray 120. The ejector can include an ejector shaft connected to the ice-removing motor 111 in the control box 110 and a plurality of ejector pins formed on the eject shaft to be spaced apart from each other. The eject pin can rotate in a predetermined direction around the ejector shaft to remove the ice in the ice tray 120.

The ice-removing heater 130 can be provided under the ice tray 120. At this time, the ice-removing heater 130 can be provided in surface contact with the outer circumferential surface of the ice tray 120. The ice-removing heater 130 can be provided in the longitudinal direction of the ice tray 120. The ice-removing heater 130 can generate heat over a predetermined area. The ice-removing heater 130 can be formed of one of a sheath heater, a cord heater, and a planar heater. Alternatively, the ice-removing heater 130 can also be a type in which the cord heater is insulated with a planar insulator. The ice-removing heater 130 can be manufactured in a thin shape, and for example, the thickness of the ice-removing heater 130 can be 0 to 1 mm or less. The lower limit of the thickness of the ice-removing heater 130 can be appropriately set at the level of those skilled in the art according to the materials of a heat-generating body and an insulating member constituting the ice-removing heater 130. The ice-removing heater 130 can be manufactured in the thin shape to reduce the heat capacity of the ice-removing heater 130, so that the ice-removing heater 130 can be raised to a predetermined temperature within a short time. In this case, it is possible to reduce the power consumption used in the ice-removing heater 130. The ice-removing heater 130 can use, for example, a positive temperature coefficient (PTC) heater, but is not limited thereto.

A cover 140 can be formed under the ice-removing heater 130. The cover 140 can serve to allow the ice-removing heater 130 to be in close contact with the ice tray 120, and also serve to protect the ice-removing heater 130 and the ice tray 120 from the outside. In addition, the cover 140 can also serve to prevent water or frost falling from the ice tray 120 from falling to another space of the refrigerator.

The control box 110 can be provided on one side of the ice tray 120. The control box 110 can be coupled to the ice tray 120 on one side of the ice tray 120. A control unit (not shown) configured to control the entire operation of the ice maker 100 can be provided in the control box 110. In addition, the control box 110 can be provided with the ice-removing motor 111 configured to rotate the ejector in a predetermined direction. A power supply unit (not shown) configured to supply a power source to the ice-removing motor and the ice-removing heater can be provided in the control box.

Here, the control unit can control the ON or OFF operation of the ice-removing heater 130, for example, according to a rotation position of the ejector or the lapse of the operation time of the ejector. Specifically, the control unit (not shown) can operate the ice-removing heater 130 when the temperature of the ice tray 120 reaches a preset ice-making temperature (i.e., the temperature at which the ice-making water in the ice tray 120 is fully iced).

Next, the control unit rotates the ejector to start to remove the ice in the ice tray 120. When the position of the ejector passes through the ice-removing heater 130, the control unit can turn off the ice-removing heater 130. In this case, it is possible to reduce the power consumption required to melt the ice. At this time, the control unit confirms the home position of the ejector through a position sensor and then accumulates and calculates the number of pulse signals input from the ice-removing motor 111, so that the current position of the ejector can be confirmed.

Here, while it has been described that the control unit turns on all of the ice-removing heaters 130 and then turns off the ice-removing heater 130 when the ejector passes through the ice-removing heater 130, but the control unit is not limited thereto and can control the operation of the ice-removing heater 130 in various methods.

In addition, while it has been described here that the control unit controls the ice-removing heater 130 according to the position of the ejector, but is not limited thereto, and the control unit can also control the ice-removing heater 130 according to the elapsed time after rotating the ejector.

The ice maker 100 according to the exemplary embodiment of the present disclosure can include the detecting unit 160. The detecting unit 160 can be to sense various information in the ice tray 120. The detecting unit 160 can be disposed between the ice tray 120 and the control box 110. One side of the detecting unit 160 is exposed to one of the plurality of ice-making grooves 122 formed in the ice tray 120 to sense various information on conditions of the ice-making groove 122. The detecting unit 160 is electrically connected to the control unit 150 positioned in the control box 110 to transmit the information sensed by the detecting unit 160 to the control unit 150, and therefore, the operation of the ice maker 100 can be controlled. According to the exemplary embodiment of the present disclosure, a first connecting line 170 and a second connecting line 180 can be used to connect the detecting unit 160 and the control unit 150. Here, the detecting unit 160 can be formed to directly contact the ice-making water accommodated in the ice-making groove 122. The detecting unit 160 can be directly exposed to the ice-making water, thereby more reliably detecting an electrical signal such as the change in the capacitance or energization sensed by the detecting unit 160.

Here, the control unit 150 can include not only a case where a wiring is connected to a printed circuit board (PCB) to connect various components or an element is attached, but also a case where a wiring is connected without printed circuit board.

The first connecting line 170 and the second connecting line 180 can be fixed or insulated to the detecting unit 160 by welding or soldering.

The detecting unit 160 can sense various information on the ice-making water (W) accommodated in the ice tray 120 and/or the ice-making groove 122, and in particular, sense the temperature of the ice tray 120 and the ice-making water or the water level of the supplied ice-making water (W). Therefore, even with a simple configuration, the amount of ice-making water (W) supplied to the ice tray 120 can be accurately detected, thereby forming optimal ice.

In addition, the detecting unit 160 can be spaced apart from the ice tray 120 by a predetermined distance or insulated by an insulating member having a predetermined thickness. Therefore, it is possible to prevent the electrical signal detected by the detecting unit 160 from flowing toward the ice tray 120 to weaken the electrical signal.

Figure 13:
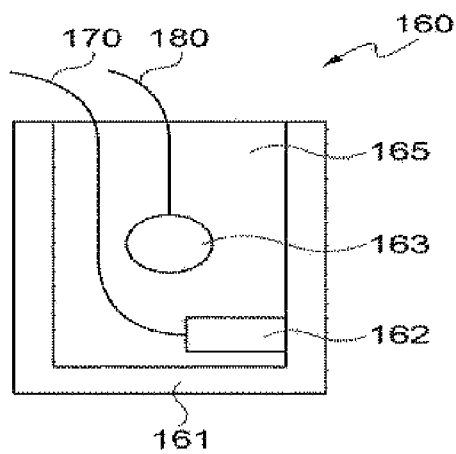
FIG. 13 is a diagram showing a first exemplary embodiment of the detecting unit shown in FIG. 12.

FIG. 13 is a diagram showing the first exemplary embodiment of the detecting unit shown in FIG. 12.

Referring to FIG. 13, the detecting unit 160 can include a temperature sensor 163 in the sensor housing 161. As described above, one side of the sensor housing 161 of the detecting unit 160 can be exposed to the ice-making groove 122. Referring to FIG. 13, the right side surface of the sensor housing 161 can be exposed to the ice-making groove 122. The sensor housing 161 is made of a conductive material so that a current can flow. For example, the sensor housing 161 can be made of a metal material.

The temperature sensor 163 can be positioned in the sensor housing 161. The temperature sensor 163 can detect the temperature of the ice tray 120. The temperature sensor 163 can be connected to the control unit 150 through the second connecting line 180, and can transmit the temperature information detected through the temperature sensor 163 to the control unit through the second connecting line 180.

Originally, the detecting unit 160 focuses on measuring the temperature of the ice tray 120, but considering that the sensor housing 161 of the detecting unit 160 is made of a conductive material, the detecting unit 160 can also serve as a water level sensor configured to confirm the water level of the ice-making water (W) in the ice-making groove 122 through the sensor housing 161. In other words, the sensor housing 161 of the detecting unit 160 can serve as an electrode of the water level sensor. When the water level of the ice-making water (W) in the ice-making groove 122 reaches the position of the sensor housing 161, the current flowing through the sensor housing 161 can be energized to detect that the water level of the ice-making water (W) has reached the position of the sensor housing 161. Through such a method, it is possible to accurately confirm the water level of the ice-making water (W).

A connecting member 162 electrically connected to the sensor housing 161 can be disposed in the sensor housing 161, and the connecting member 162 and the control unit 150 can be electrically connected through the first connecting line 170. Therefore, information on the water level of the ice-making water (W) detected through the sensor housing 161 can be delivered to the control unit 150 through the connecting member 162.

The other spaces in the sensor housing 161 can be occupied by a filling unit 165 made of an insulating material to insulate the components positioned in the sensor housing 161.

The sensor housing 161 can be positioned at an appropriate ice-making water level of the ice tray 120. The appropriate ice-making water level can refer to an appropriate water level at which the ice is prevented from being insufficiently produced because the ice-making water (W) accommodated in the ice-making groove 122 of the ice tray 120 does not overflow from the ice tray 120 or the ice-making water (W) is insufficient.

Figure 14:
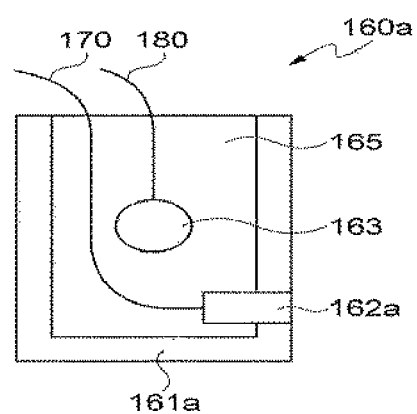
FIG. 14 is a diagram showing a second exemplary embodiment of the detecting unit shown in FIG. 12.

FIG. 14 is a diagram showing a second exemplary embodiment of the detecting unit shown in FIG. 12. A description of the configuration corresponding to the aforementioned exemplary embodiment will be omitted.

Referring to FIG. 14, in a detecting unit 160a according to the present exemplary embodiment, a part of a sensor housing 161a can be cut, and a contact member 162a can be disposed through the cut portion of the sensor housing 161a. The contact member 162a can be disposed through the sensor housing 161a, and can have one side exposed to the ice-making groove 122. The contact member 162a can be made of a metal, which is a conductive material. According to the present exemplary embodiment, unlike the aforementioned exemplary embodiment, since the contact member 162a can be exposed to the ice-making groove 122 and in direct contact with the ice-making water (W) in the ice-making groove, the contact member 162a can be made of a conductive material, and the sensor housing 161a cannot need to be conductive. The contact member 162a and the control unit 150 can be electrically connected through the first connecting line 170. Therefore, information on the water level of the ice-making water (W) detected through the contact member 162a can be delivered to the control unit 150.

Figure 15:
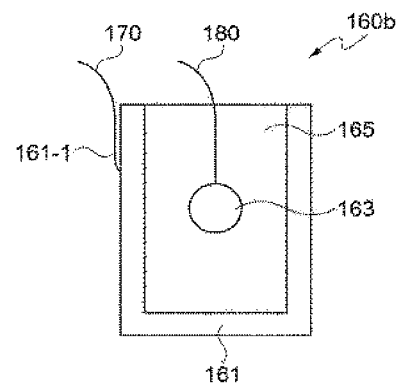
FIG. 15 is a diagram showing a third exemplary embodiment of the detecting unit shown in FIG. 12.

FIG. 15 is a diagram showing a third exemplary embodiment of the detecting unit shown in FIG. 12. A description of the configuration corresponding to the aforementioned exemplary embodiment will be omitted.

Referring to FIG. 15, in a detecting unit 160b according to the present exemplary embodiment, the sensor housing 161 can be directly connected to the control unit 150 through the first connecting line 170. A connecting unit 161-1 configured to bond to the first connecting line 170 can be formed on the other side of the sensor housing 161 other than one side exposed to the ice-making groove 122. Referring to FIG. 15, since one side of the sensor housing 161 exposed to the ice-making groove 122 is the right side, the connecting unit 161-1 can be formed on the left side. However, the position of the connecting unit 161-1 is not limited thereto.

Figure 16:
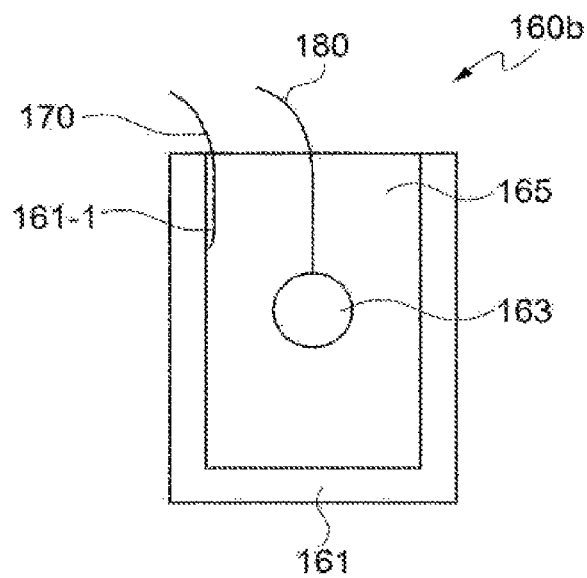
FIG. 16 is a diagram showing a fourth exemplary embodiment of the detecting unit shown in FIG. 12.

FIG. 16 is a diagram showing a fourth exemplary embodiment of the detecting unit shown in FIG. 12.

Referring to FIG. 16, in the detecting unit 160b according to the present exemplary embodiment, the sensor housing 161 can be directly connected to the control unit 150 through the first connecting line 170. The connecting unit 161-1 configured to bond to the first connecting line 170 can be formed in the sensor housing 161 other than one side of the sensor housing 161 exposed to the ice-making groove 122. Referring to FIG. 16, since the one side of the sensor housing 161 exposed to the ice-making groove 122 is the right side, the connecting unit 161-1 can be formed in the left side. However, the position of the connecting unit 161-1 is not limited thereto.

Figure 17:
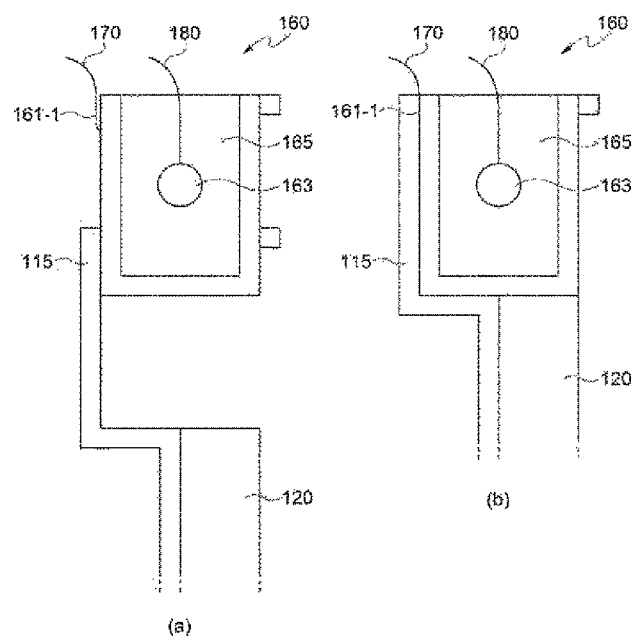
FIG. 17 is a diagram showing a coupling state between the detecting unit shown in FIG. 15 and a first connection line.

FIG. 17 is a diagram showing a coupling state between the detecting unit shown in FIG. 15 and the first connecting line.

Referring to FIG. 17, press-fitting can be used to strengthen a bonding state between the connecting unit 161-1 formed in the detecting unit 160b and the first connecting line 170. As shown in (a) of FIG. 17, in a state where the connecting unit 161-1 and the first connecting line 170 are connected by a predetermined adhesive force, the detecting unit 160b can be press-fitted into an accommodating unit 115 formed on the ice tray 120 side of the control box 110. As the detecting unit 160b is press-fitted into the accommodating unit 115, the detecting unit 160b and the accommodating unit 115 can be in close contact with each other. Therefore, the bonding state between the connecting unit 161-1 and the first connecting line 170 can be firmly fixed. The state where the connecting unit 161-1 and the first connecting line 170 are firmly fixed is as shown in (b) of FIG. 17.

Figure 18:
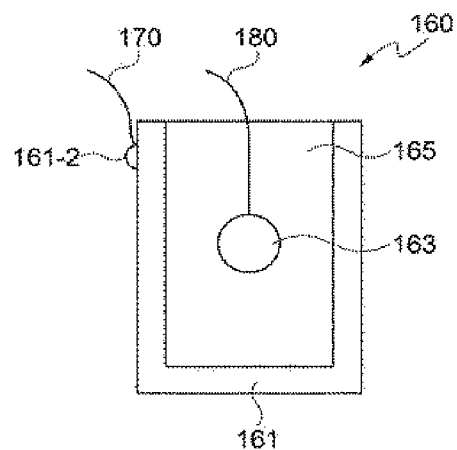
FIG. 18 is a diagram showing another coupling state between the detecting unit shown in FIG. 15 and the first connection line.

FIG. 18 is a diagram showing another coupling state between the detecting unit shown in FIG. 15 and the first connecting line.

Referring to FIG. 18, a welding unit 161-2 can be formed by performing welding on the side of the connecting unit 161-1 of the detecting unit 160b. Therefore, the welding unit 161-2 covers the connecting unit 161-1, and therefore, the bonding between the connecting unit 161-1 and the first connecting line 170 can be firmly fixed. The welding can be spot welding including electric welding and arc welding.

Figure 19:
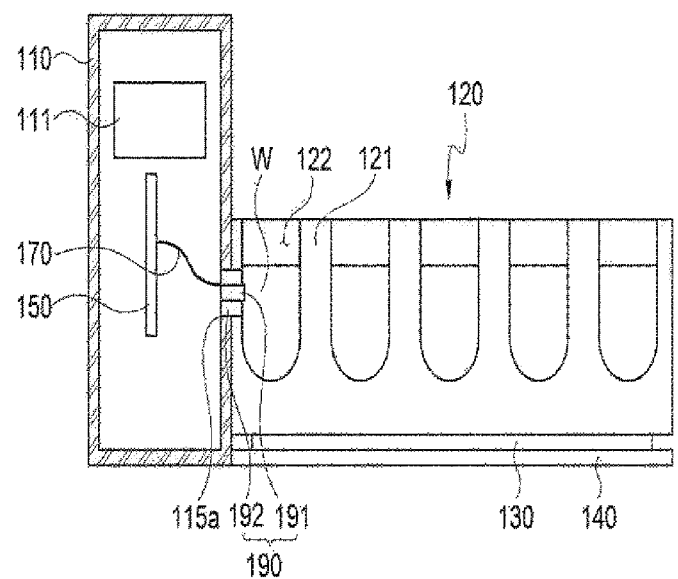
FIG. 19 is a diagram showing an ice maker according to a third exemplary embodiment of the present disclosure.

FIG. 19 is a diagram showing an ice maker according to a third exemplary embodiment of the present disclosure. According to the present exemplary embodiment, a description of the configuration corresponding to the aforementioned exemplary embodiment will be omitted.

Referring to FIG. 19, the ice maker 100 can include a water level sensing member 190 instead of the detecting unit 160. The detecting unit 160 according to the aforementioned exemplary embodiment includes the temperature sensor 163 whereas the water level sensing member 190 does not include the temperature sensor 163 and serves to sense only the water level of the ice-making water (W) in the ice-making groove 122. The water level sensing member 190 is disposed between the ice tray 120 and the control box 110, and an inserting unit 115a can be formed in the ice tray 120 to dispose the water level sensing member 190.

The water level sensing member 190 can include a metal member 191 exposed to the ice-making groove 122 and an insulating member 192 surrounding the metal member 191 on one side thereof. The metal member 191 can be electrically connected to the control unit 150 through the first connecting line 170. The metal member 191 can be a metal rod disposed so that the longitudinal direction penetrates between the ice tray 120 and the control box 110.

Since one side of the metal member 191 is exposed to the ice-making groove 122, the ice-making water (W) can be in contact with the metal member 191 when the ice-making water (W) in the ice-making groove 122 reaches the position of the metal member 191. Therefore, similarly to the case of the detecting unit 160 described above, the metal member 191 can serve as the electrode of the water level sensor. The metal member 191 can be provided in a pair spaced apart from each other, and when the water level of the ice-making water (W) in the ice-making groove 122 reaches the position of the pair of metal members 191, the pair of metal members 191 can have a current energized by the ice-making water (W) to detect that the water level of the ice-making water (W) has reached the position of the metal member 191. Through such a method, it is possible to accurately confirm the water level of the ice-making water (W). In this case, when a voltage of 3 V or more is applied, it is possible to detect the water level of the ice-making water (W) by detecting a voltage of 2.5 V or more.

Figure 20:
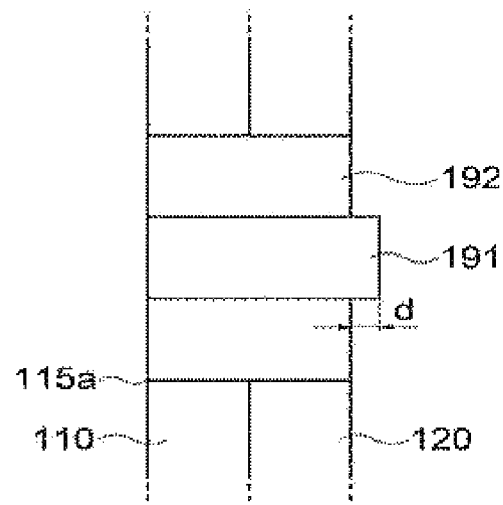
FIG. 20 is an enlarged diagram of a part of FIG. 19.

FIG. 20 is an enlarged diagram of a part of FIG. 19.

Referring to FIG. 20, the metal member 191 can protrude toward the ice-making groove 122 by a predetermined interval (d) to facilitate the contact with the ice-making water (W) in the ice-making groove 122. However, when the metal member 191 excessively protrudes toward the ice-making groove 122, the ice-making water (W) is caught by the metal member 191 when the ice-making water (W) becomes ice and therefore, cannot be removed. To prevent such a problem, the protruding interval (d) of the metal member 191 can be 3 mm or less.

According to the present exemplary embodiment, one metal member 191 is described as an example, but the metal member 191 is not limited thereto. Since there can be a plurality of metal members 191, the water level of the ice-making water (W) can also be detected step by step. In addition, the water level sensing member 190 can not only replace the detecting unit 160, but also the water level sensing member 190 and the detecting unit 160 can be used together. In this case, both the detecting unit 160 and the water level sensing member 190 are connected to the control unit 150, and each can detect the water level of the ice-making water (W) at different positions.

Figure 21:
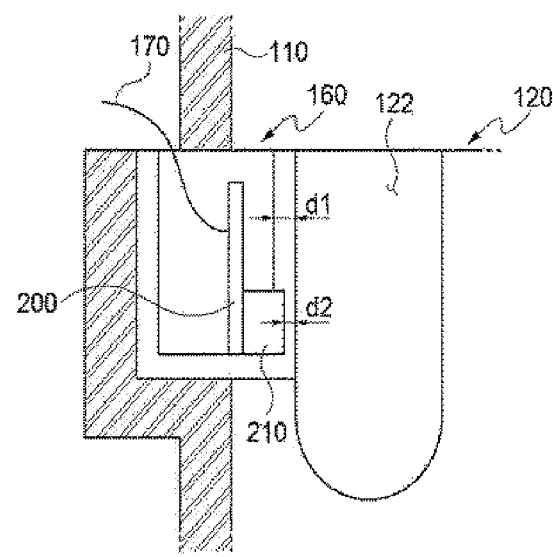
FIG. 21 is a diagram showing another exemplary embodiment of FIG. 20.

FIG. 21 is a diagram showing another exemplary embodiment of FIG. 20.

Referring to FIG. 21, at least a part of the sensor housing of the detecting unit 160 in the ice maker according to the present exemplary embodiment can be made of a silicon material, and the side of the sensor housing of the detecting unit 160 exposed toward the ice tray 120 can be made of a metal.

At least one of a capacitive sensor 210, an energization sensor (not shown), and a temperature sensor (not shown) can be included in the sensor housing of the detecting unit 160, and at least a part of the inside of the sensor housing of the detecting unit 160 can be molded or coated with an insulating material.

In the sensor housing of the detecting unit 160, the capacitance sensor 210 configured to measure the water level in the ice-making groove 122 of the ice tray 120 and the control unit configured to determine the water level in the ice-making groove 122 by storing a comparison value compared with a measured value of the capacitance sensor 210 and comparing them can be formed on one substrate 200.

In addition, the capacitive sensor 210 and the energization sensor can be disposed on one substrate 200 together with the temperature sensor.

A thickness (d2) of a part of the sensor housing of the detecting unit 160 exposed to the outside to sense whether the water is supplied can be formed to be thinner than a thickness (d1) of the other part, thereby improving the sensing ability through the sensor housing 160.

FIG. 21 shows that the sensor housing of the detecting unit 160 is disposed in one ice-making groove 122 of the ice tray 120, but the present disclosure is not limited thereto, and the sensor housing of the detecting unit 160 can be disposed in each of the plurality of ice-making grooves 122.

A stepped structure or an inclined structure for preventing the sensor housing from being separated from the control box 110 or the ice tray 120 can be formed in the sensor housing of the detecting unit 160.

In addition, if the capacitance is sensed through the capacitive sensor 210, the capacitive sensor 210 and the control unit can be connected by a lead wire. The connecting line can be a lead wire shielded According to the aforementioned exemplary embodiments, while it has been described that the detecting unit and the sensor housing of the present disclosure are applied to the ice maker including the ejector, the present disclosure is not limited thereto.

Figure 22:
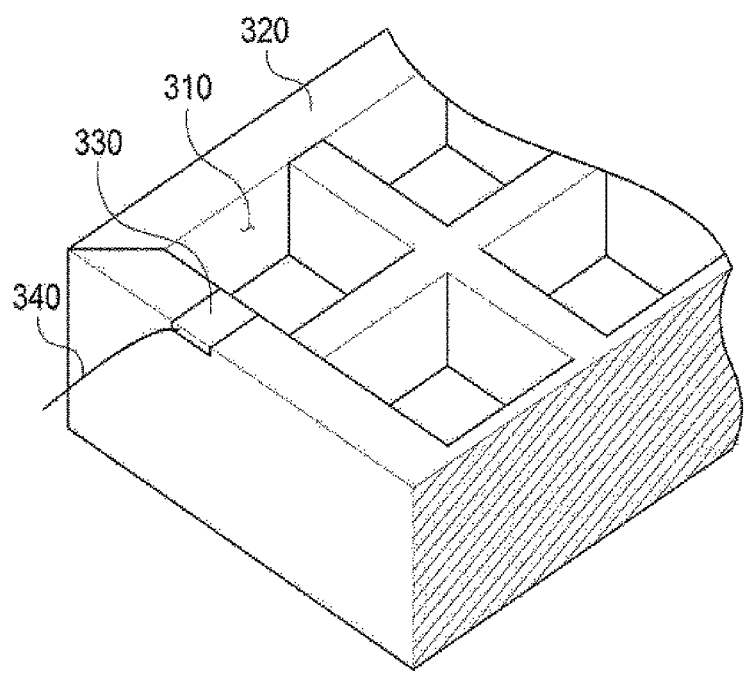
FIG. 22 is a diagram showing a state where the detecting unit is installed on an ice tray of a twist ice maker.

FIG. 22 is a diagram showing a state where the detecting unit is installed on an ice tray of a twist ice maker.

Referring to FIG. 22, a detecting unit 330 configured to control the water supply can also be formed in the ice tray 320 of the twist ice maker. The twist ice maker can twist the ice tray 320 through an ice-removing motor to remove the ice made in the ice-making groove 310. Connection of the detecting unit 330 to the control unit through the connecting line 340 can be the same as in the aforementioned exemplary embodiment.

In addition, the detecting unit can be installed in an auger-type ice maker to control the water supply in the ice tray in which water is accommodated. In addition, the detecting unit or the temperature sensor can be inserted into various devices into which water or other liquid flows, such as a refrigerator, a washing machine, a dehydrator, a dryer, a humidifier, a dehumidifier, and a fuel pumping module, to control the water supply. In this case, to increase the output of the sensing control signal, a sensing control signal output unit can be formed on one side of the detecting unit.

In addition, the ice maker according to the exemplary embodiment of the present disclosure can perform the water supply control one or more times, and determine whether sensing is performed after the water supply one time.

Those skilled in the art to which the present disclosure pertains will understand that the present disclosure can be embodied in other specific forms without changing the technical spirit or essential features thereof. Therefore, it should be understood that the aforementioned exemplary embodiments are illustrative in all respects and not restrictive. The scope of the present disclosure is indicated by the appended claims rather than the aforementioned detailed description, and all changes or modifications derived from the meaning and scope of the claims and their equivalents should be construed as being included in the scope of the present disclosure.

The present disclosure provides the ice maker, the refrigerator, and the method for controlling the same, which can accurately detect whether the ice-making water accommodated in the ice-making groove is full.

What is claimed is:

1. An ice maker comprising:
a control box having a control unit disposed therein;
an ice tray disposed on one side surface of the control box, and formed with an ice-making groove in which ice-making water is accommodated;
a water supplier configured to supply the ice-making water to the ice-making groove; and
a detecting unit configured to detect the water level of the ice-making water accommodated in the ice-making groove,
wherein the detecting unit comprises:
a sensor housing formed of a non-conductor spaced apart from the ice tray and installed on one side surface of the control box, and having a water level measuring hole into which the ice-making water in the ice-making groove flows formed in one side surface thereof;
a sensor formed of a conductor in contact with the ice-making water flowing into the sensor housing through the water level measuring hole to detect the water level of the ice-making water; and
a connector wire having one end connected to the sensor, and the other end connected to the control unit,
wherein after a setting time after the sensor detects an initial value of the capacitance, the control unit controls the water supplier to stop the water supply or additionally supply the water to the ice-making groove using a change value of a capacitance value detected by the sensor,
wherein the control unit performs the stop of the water supply or the additional water supply by the set number of times again,
wherein after the setting time after the water supplier starts the water supply to the ice-making groove, the control unit controls the water supplier to stop the water supply to the ice-making groove when the change value of the capacitance value is equal to or larger than a first setting value, controls the water supplier to additionally supply the water to the ice-making groove when the change value of the capacitance value is smaller than the first setting value,
wherein after the setting time after the water supplier additionally supplies the water to the ice-making groove, the control unit controls the water supplier to stop the additional water supply to the ice-making groove when the change value of the capacitance value is equal to or larger than a second setting value that is larger than the first setting value, and controls the water supplier to additionally supply the water to the ice-making groove when the change value of the capacitance value is smaller than the second setting value.

2. The ice maker of claim 1,
wherein the sensor is a temperature sensor or a capacitance sensor.

3. The ice maker of claim 1,
wherein an upper surface of the sensor housing is formed with a sensor inserting groove communicating with the water level measuring hole, and
wherein the sensor is inserted into a sensor inserting groove.

4. The ice maker of claim 1,
wherein one side surface of the sensor housing is disposed on the same plane as one side surface of the control box.

5. The ice maker of claim 1,
wherein the inside of the sensor housing is insulated and waterproofed by a filling material.

6. The ice maker of claim 3,
wherein the sensor housing comprises:
a housing main body having the sensor inserting groove and the water level measuring hole formed therein; and
a mounting bracket extending horizontally from an upper end of the housing main body, and
wherein one side surface of the mounting bracket is formed with a sensor inserting guide groove extending upward from the sensor inserting groove.

7. The ice maker of claim 6,
wherein one end of the connector wire connected to the sensor is disposed in the sensor inserting guide groove.

8. The ice maker of claim 7,
wherein one side surface of the mounting bracket is formed with a wire accommodating groove extending horizontally from the sensor inserting guide groove and having a part of the connector wire accommodated therein.

9. The ice maker of claim 1,
wherein the control unit performs the stop of the water supply or the additional water supply by the set number of times again.

10. A refrigerator comprising: the ice maker of claim 1.

11. A method for controlling an ice maker comprising: an ice tray formed with an ice-making groove in which ice-making water is accommodated, a water supplier configured to supply the ice-making water to the ice-making groove, and a capacitance sensor configured to detect the water level of the ice-making water accommodated in the ice-making groove, the method comprising:
supplying water that starts, by the water supplier, the water supply to the ice-making groove; and
additionally supplying or stopping of the water supply that stops the water supply or additionally supplies the water to the ice-making groove by the water supplier using a change value of a capacitance value detected by the capacitance sensor after a setting time after the capacitance sensor detects an initial value of the capacitance value,
wherein in the additionally supplying or stopping of the water supply, the water supplier stops the water supply to the ice-making groove in response to the change value of the capacitance value being equal to or larger than a first setting value, and
wherein the water supplier starts the additional water supply to the ice-making groove in response to the change value of the capacitance value being smaller than the first setting value,
wherein in the case of additional water supply, the water supplier stops the additional water supply to the ice-making groove in response to the change value of the capacitance value being equal to or larger than the second setting value that is larger than the first setting value after the setting time after the commencement of the additional water supply after the setting time, and
wherein the water supplier additionally supplies the water to the ice-making groove in response to the change value of the capacitance value being smaller than the second setting value after the commencement of the additional water supply after the setting time.

12. The method of claim 11,
wherein the additionally supplying of the water or stopping of the water supply is performed again by the set number of times.

\* \* \* \* \*